United States Patent [19]

Ohmi

[11] 4,287,847

[45] Sep. 8, 1981

[54] APPARATUS FOR DISTRIBUTING LINING MATERIAL IN CAP SHELLS

[75] Inventor: Hidehiko Ohmi, Hiratsuka, Japan

[73] Assignee: Toyo Seikan Kaisha, Ltd., Tokyo, Japan

[21] Appl. No.: 51,505

[22] Filed: Jun. 25, 1979

[30] Foreign Application Priority Data

Oct. 7, 1978 [JP] Japan ............................. 53-82888

[51] Int. Cl.³ ..................... B05C 7/00; B29D 31/00; B29F 3/00
[52] U.S. Cl. ................................. 118/215; 83/324; 83/593; 425/295; 425/311; 425/809; 118/230
[58] Field of Search .............. 83/324, 593; 118/215; 425/295, 311, 809

[56] References Cited

U.S. PATENT DOCUMENTS

| | | | |
|---|---|---|---|
| 2,053,030 | 9/1936 | Hall | 83/593 |
| 3,590,678 | 7/1971 | Hasten | 83/593 |
| 3,782,329 | 1/1974 | Everett | 118/215 |
| 3,867,081 | 2/1975 | Everett | 425/295 |
| 4,060,053 | 11/1977 | Ohmi | 83/593 X |

FOREIGN PATENT DOCUMENTS 800307 8/1958 United Kingdom .
1451328 9/1976 United Kingdom .

*Primary Examiner*—Leland A. Sebastian
*Attorney, Agent, or Firm*—Pennie & Edmonds

[57] ABSTRACT

Apparatus for distributing lining material in cap shells where the apparatus has a lining material extrusion means including an extrusion passage positioned above a path of cap shells moving through the apparatus and a rotatable knife positioned above the exit end of the extrusion passage for cutting lining material as it is extruded from the passage. A drive means is provided for rotating the knife and is connected to the knife by means of a transmission means. The transmission means includes at least two sets of non-circular gear pairs with the relative angle between the sets being adjustable whereby the rotational speed of the knife may be varied.

4 Claims, 14 Drawing Figures

APPARATUS FOR DISTRIBUTING LINING MATERIAL IN CAP SHELLS

TECHNICAL FIELD

The present invention relates to an apparatus for distributing lining material in cap shells which are to be utilized as caps for bottles, containers and the like. In particular the invention relates to an apparatus which is capable of varying the amount of lining material distributed to cap shells and to accommodate cap shells having varying depths and shells having skirt lengths greater than the shell diameters.

BACKGROUND ART

An apparatus for dispensing predetermined amounts of lining material in cap shells has been utilized in the past. For example in Japanese Patent Application Publication 42-20759 (1967) an apparatus is disclosed for distributing a predetermined amount of lining material in cap shells where the apparatus has a shell transport means for moving a cap shell through the machine along a path at a predetermined speed. A lining material extrusion means is positioned along and above the path of movement of the shell through the machine where the extrusion means extrudes a predetermined amount of lining material through an extrusion passage and where a rotatable cutting knife is positioned adjacent the exit end of the passage for cutting across the lining material as it is forced from the passage and for moving the material into the shell. A driving apparatus for rotating the knife is timed with relation to the transport means for moving the cap shell through the machine.

It is difficult, however, in a machine following the construction that application to distribute predetermined amounts of lining material into a cap shell having a deep depth or a long skirt. This is because the cutting knife rotates at a constant speed with respect to movement of the shell through the machine with the result that the outer radial edge of the knife strikes against the skirt of the cap shell resulting in unsatisfactory operation.

It has been proposed to overcome the deficiency outlined above by providing a machine which has means for driving the cutting knife at varying rotational speeds. Such a machine is disclosed in my prior U.S. Pat. No. 4,060,053 wherein a means is provided for varying the rotational speed of the knife with respect to the speed of movement of a cap shell such that the radial edge of the cutting knife decelerates gradually as the cutting knife approaches the cap shell transport path and accelerates gradually as it departs from the shell transport path. Contact between the radial outer end of the cutting knife and the skirt of the cap shell is thus prevented even in cap shells having deep depths. Further the machine as disclosed in my prior patent is capable of substantially equalizing the speed of movement of the cap shell and the speed component of the radial outer tip of the knife in the direction of the path of movement of the shell through the apparatus at the instant the cutting knife deposits the lining material into a predetermined area on the inside bottom surface of the cap shell. The cutting knife then rotates upwardly and away from the predetermined area such that once the lining material has been deposited in the prescribed area, it will remain without danger of later movement by the cutting knife as the knife continues to rotate.

The driving means driving the cutting knife in the machine of my prior U.S. patent comprises an electric motor drive source that rotates at a predetermined speed and includes a transmission mechanism that transmits the output of the electric motor to the cutting knife while varying the speed of rotation of the cutting knife. As shown the transmission mechanism includes a pair of non-circular gears to provide the varying drive speed to the cutting knife. It is also possible to utilize a pair of eccentric gears, special ring mechanisms or cam mechanisms instead of non-circular gears. However when eccentric gears are used, it is difficult to maintain balance between the gears under high speed operation because of the eccentricity of the gears to the axis of rotation. Special ring and cam mechanisms are not satisfactory because of their high manufacturing costs.

When using non-circular gear pairs for converting constant speed rotation to variable speed rotation, the degree of speed conversion or variation achieved depends upon the degree of oblateness of the non-circular gears where the degree of oblateness of a gear is defined as $\epsilon = $ long diameter $-$ short diameter/long diameter $+$ short diameter.

As disclosed in my early patent, the required degree of conversion or variation of the rotational speed of the cutting knife that must be obtained depends upon the depth of the cap shell on which the lining material is to be distributed. This then requires that there be a set of non-circular gears available having a particular degree of oblateness for each cap shell of a particular depth.

Non-circular gears commercially available are limited to predetermined degrees of oblateness $\epsilon$ as for example values of 0.888, 0.155, 0.213, 0.264, 0.304 and 0.331 for gears sold by Takeuchi Gear Works, Ltd. To obtain gears having degrees of oblateness $\epsilon$ outside those commercially available requires special manufacture at a resulting high cost. Consequently the cost of a machine that may deposit predetermined amounts of lining material in cap shells and which is to be able to accommodate cap shells of varying depths may be unduly expensive if non-circular gears are required that are not commercially available.

From a non-circular gear manufacturing standpoint, it is difficult to form the teeth of gears coming within certain degrees of oblateness, particularly in excess of 0.331. This limitation presents a limit of the degree of speed conversion that may be obtained from a set of non-circular gear pairs.

It is therefore an object of my invention to provide for an apparatus for distributing lining material in cap shells having varying depths where the degree of rotational speed of the cutting knife utilized to cut a predetermined amount of lining material extruded from an extrusion passage and to deposit the same onto a predetermined area of the bottom of a shell may be easily and accurately varied and without involving change of expensive gear sets.

DISCLOSURE OF INVENTION

Broadly an apparatus for distributing lining material in cap shells constructed according to my invention comprises a cap shell transport means for moving the shells at a predetermined speed along a transport path in the machine. A lining material extrusion means is positioned over and along the path for extruding a predetermined amount of lining material through an extrusion passage. A rotatable cutting knife is positioned adjacent the exit end of the passage and serves to cut off lining material as it emerges from the passage and to deposit the material onto the bottom of a cap shell. Drive means are included in the apparatus for rotating the knife where the drive means is connected to the knife by way of a transmission means. The transmission means in turn comprises at least two sets of non-circular gear pairs wherein the relative drive angle between the two sets of gears is adjustable so as to vary the speed of rotation of the knife.

Preferably one set of gear pairs has an input shaft and another set an output shaft where the input and the output shafts are connected by adjustable connecting means whereby the relative drive angle between the two shafts may be varied to in turn vary the relative angle between sets of gear pairs.

The adjustable connecting means in turn preferably comprises a coupling element positioned on the facing end of each of the input and output shafts where each coupling element has radially extending drive surfaces where the surfaces of both elements are mutually engageable.

The apparatus also preferably includes a provision for mounting one of the coupling elements so that it is movable axially with respect to its shaft in order that the driving surfaces of the connecting elements may be disengaged from each other in order to vary the relative angle between the two sets of gear pairs.

BEST MODE FOR CARRYING OUT THE INVENTION

The present invention is directed to a particular transmission mechanism that couples a drive source to a rotatable cutting knife of a lining dispensing apparatus of the type generally disclosed in my earlier U.S. Pat. No. 4,060,053, in Japanese Patent Application Publication No. 41-5588 (1966), in Japanese Patent Application Ser. No. 42-20759 (1972) and in U.S. Pat. No. 3,782,829. Therefore a detailed description of the various parts of a machine constructed according to my invention which are common to those publications will not be further explained and the detailed description following herein will be limited generally to the transmission mechanism itself.

Figure 1:
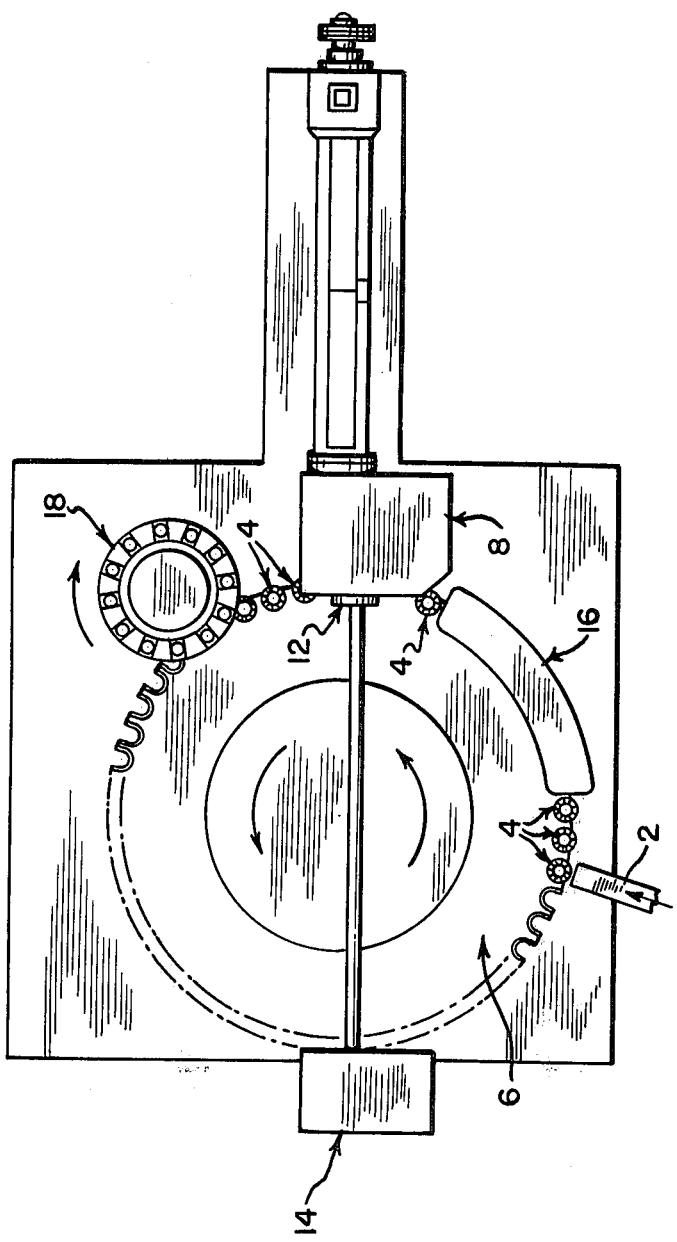
FIG. 1 is a plan view of an apparatus for dispensing lining material constructed according to the invention.
Figure 2:
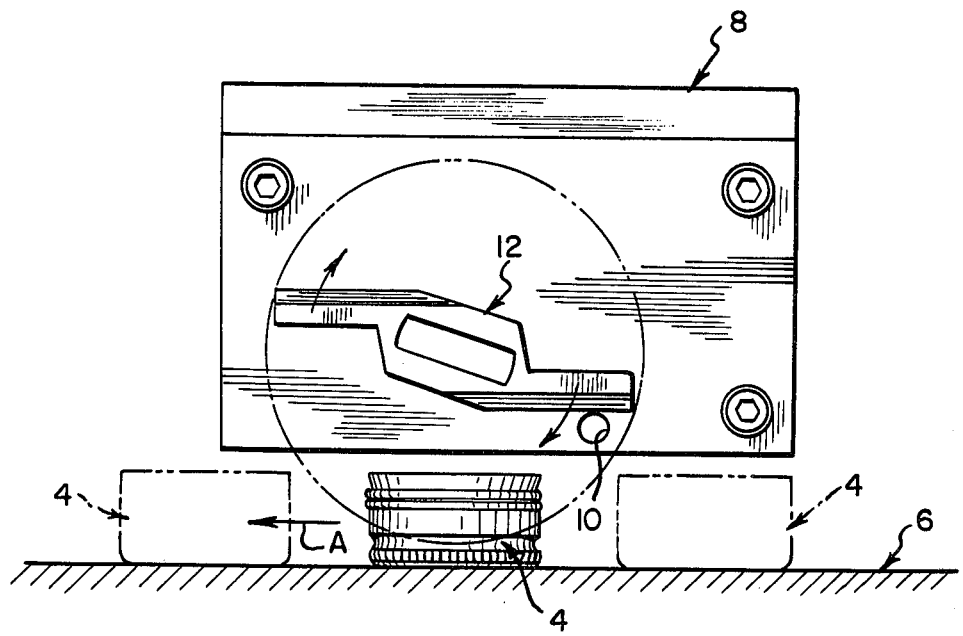
FIG. 2 is an enlarged partial end view of a portion of FIG. 1 illustrating a rotatable lining material cutting knife.

Referring to FIGS. 1 and 2, an apparatus constructed according to the invention has a cap shell transport means 6 in the form of a turntable for transporting cap shells 4 at a predetermined speed supplied from a cap chute 2. A lining material extrusion means 8 is positioned along and over the cap shell transport path through the apparatus and includes means for heating and melting prescribed amounts of lining material which is extruded through an extrusion passage. A rotatable lining material cutting knife 12 is positioned adjacent the exit end 10 of the extrusion passage so as to rotate and cut across material as it is extruded from the exit. A drive means 14 is provided for rotating the cutting knife 12 in relation to the movement of the cap shells 4 by the cap shell transport means 6. A cap shell heating apparatus 16 is mounted between the chute 2 and the lining material extrusion means 8 for heating the caps prior to the lining material being distributed onto the cap shells. After lining material has been distributed to the cap shells, the shells are then moved into a molding station 18 where the lining material is pressed to a predetermined shape on the inside bottom surface of the cap shells.

Figure 4:
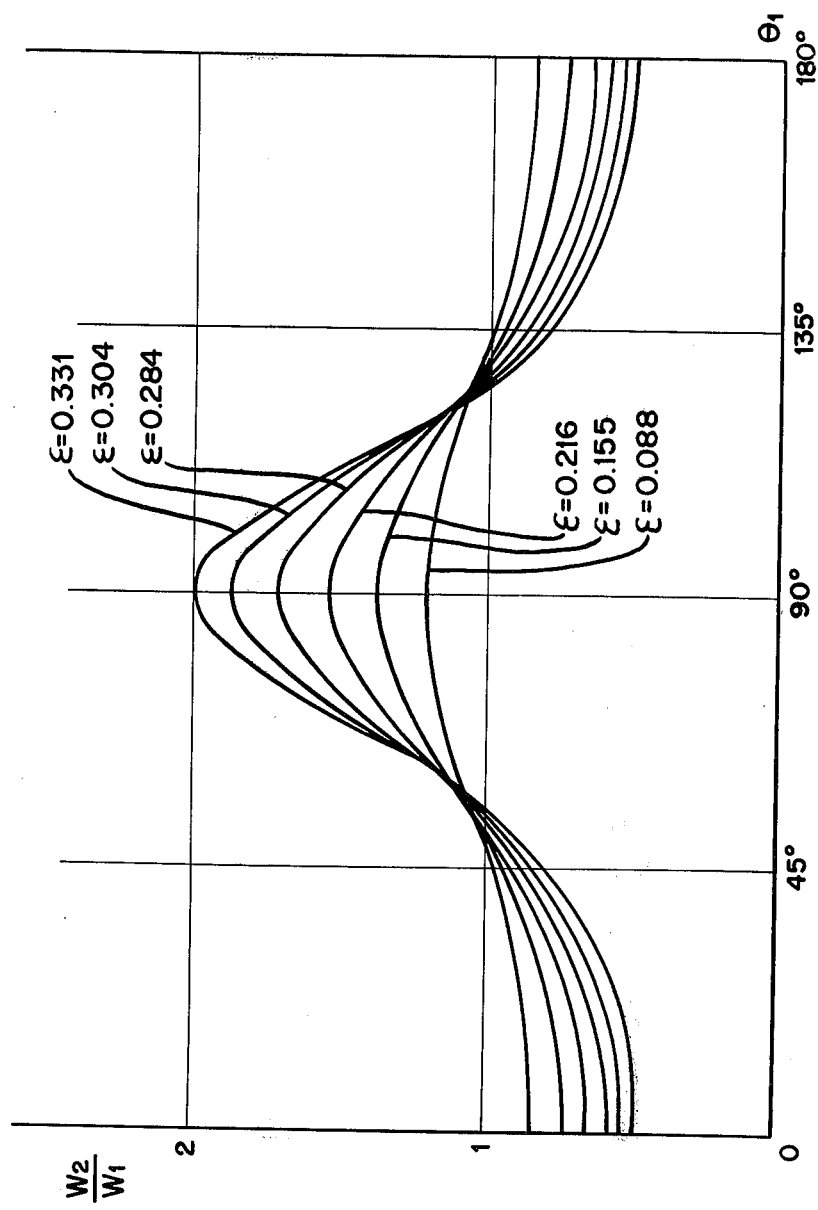
FIG. 4 is a graph illustrating variations in the rotational speed of a cutting knife when a single set of non-circular gears having different degrees of oblateness is used in a transmission connecting a drive means with a cutting knife.

The drive apparatus as disclosed in FIG. 4 of my prior U.S. Pat. No. 4,060,053 comprises a drive source in the form of an electric motor which is connected by a transmission mechanism to the rotatable cutting knife. The transmission mechanism contains one set of non-circular gears 31, 33 by which the speed of rotation of the cutting knife is varied with respect to the constant drive speed of the electric motor. The degree of variation of the rotational speed of the cutting knife will depend upon the degree of oblateness $\epsilon$ of the particular non-circular gears used.

Figure 3:
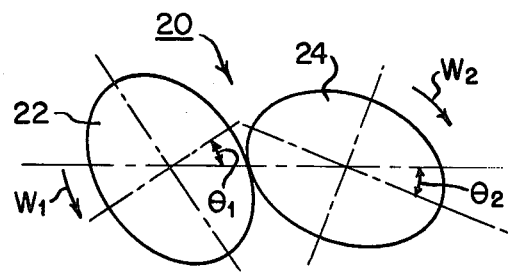
FIG. 3 is a diagrammatical sketch illustrating engagement of a single set of non-circular gears.

Referring to FIG. 3 of the present application, a set 20 of non-circular gears 22 and 24 is shown where each gear has an oblateness angle $\epsilon$. Considering angular speed $\omega_2$ of the output side non-circular gear 24 of the set at the time when the input side non-circular gear 22 is being driven at a constant speed $\omega_1$ by a drive source such as a drive motor, it will be apparent to one skilled in the art that the rotational angle $\theta_2$ of the output side non-circular gear 24 in relation to the rotational angle $\theta_1$ of the input non-circular gear 22 will be $$\theta_2 = \tfrac{1}{2} \cos^{-1}\left( \frac{k + \cos2\theta_1}{1 + k\cos2\theta_1} \right)$$

where $k = \dfrac{2g}{1+g^2}$ and the angular speed $\omega_2$ of the output non-circular gear 24, in relation to the constant speed $\omega_1$ of the input non-circular gear 22 will be $$\omega_2 = \omega_1 \frac{\sqrt{1-k^2}}{1 + k\cos 2\theta_1}$$

Consequently the rotational angular speed ratio $\omega_2/\omega_1$ will be $$\omega_2/\omega_1 = \frac{\sqrt{1-k^2}}{1 + k\cos 2\theta_1}$$

Referring to FIG. 4, variations in the rotational speed of a cutting knife (rotational angular speed ratio $\omega_2/\omega_1$) using commercially available non-circular gear pairs having oblateness angles $\epsilon$ of 0.888, 0.155, 0.218, 0.264, 0.304 and 0.331 is illustrated. For example, if a non-circular gear pair having an oblateness angle $\epsilon$ of 0.331 is used, the angular speed $\omega_2$ of the output non-circular gear 24, in respect to the constant angular speed $\omega_1$ of the input non-circular gear 22 rotating at a constant speed, will vary from a minimum angular speed of 0.5 $\omega_1$ at the time when the input non-circular gear 22 has a rotational angle $\theta_1 = 0°$, to a maximum angular speed 2 $\omega_1$.

From the above, it is seen that the cutting knife will be rotated at a nonconstant or varying speed equal to the angular speed $\omega_2$, in respect to constant angular speed $\omega_1$ of input noncircular gear 22 where $$\omega_2 = \omega_1 \frac{\sqrt{1-k^2}}{1+k\cos 2\theta_1}$$

In this case, the speed component of the radial outer tip of the cutting knife in the direction of transport of the cap shells, shown by arrow A in FIG. 2, will be $$\omega_2/\omega_1 \cos \theta_2$$

Figure 5:
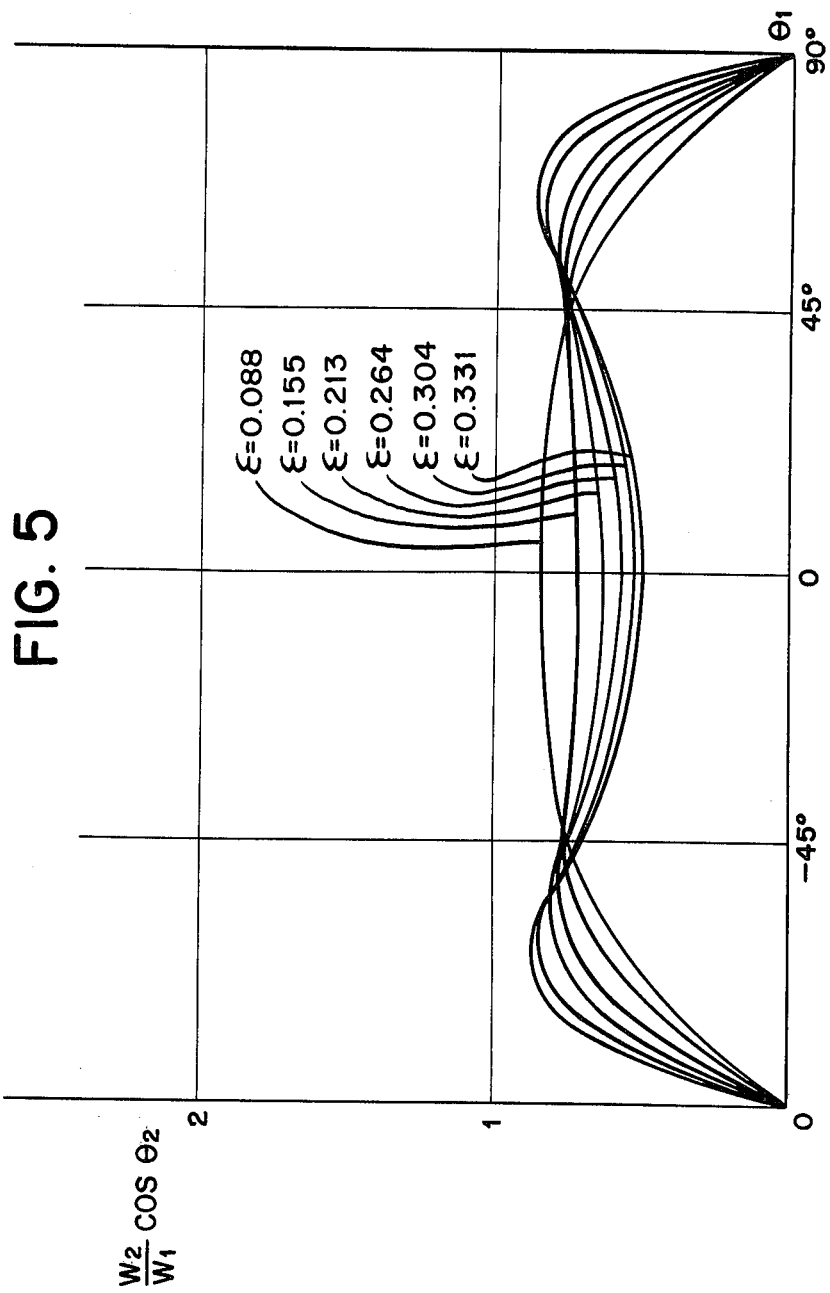
FIG. 5 is a graph illustrating variations in the speed component of the radial outer tip of a cutting knife in the cap shell transport direction when a single set of non-circular gears having different degrees of oblateness is used in a transmission connecting a drive means with a cutting knife.

The speed component $\omega_2/\omega_1 \cos\theta_2$ for a single set of non-circular gears having oblateness degrees $\epsilon$ of 0.088, 0.155, 0.213, 0.264, 0.304 and 0.331 respectively is illustrated in FIG. 5 as the ordinate. The abscissa of FIG. 5 represents the rotational angle $\theta_1$ of the input non-circular gear of a set. Thus in an apparatus of the type disclosed in my prior U.S. Pat. No. 4,060,053 having a single set of non-circular gears, when $\theta_1 = 0°$, the cutting knife has its outer radial tip closest to the inner bottom surface of a shell which is represented by a 10 in FIG. 5 of that patent.

Referring to FIG. 5 herein and to FIG.5 of my earlier patent, it is seen that in order to prevent the outer radial tip of the cutting knife from colliding with the skirt part of a cap shell, it is necessary to increase the variation in the rotational angular speed of the cutting knife as the proportion of the length of the skirt to the diameter of the cap shell in which the lining material is distributed increases, that is, as the depth of the cap shell which is to receive the lining material distribution becomes deeper. Thus in order to distribute lining material to cap shells of a prescribed depth, it becomes necessary to rotate the cutting knife at a nonconstant speed at a variation greater than the prescribed variation stipulated by the depth of the cap shell. Consequently, when rotating the cutting knife at a nonconstant speed using a set 20 of non-circular gear pairs as illustrated in FIG. 3 as the transmission mechanism, it will be necessary to use non-circular gear pairs having an oblateness degree $\epsilon$ of a value higher than that prescribed by the depth of the cap shell. On the other hand, the larger the oblateness degree $\epsilon$ of the non-circular gear pairs that is used, and consequently the larger the variation of the rotational angle speed of the cutting knife rotating at a nonconstant speed, the greater will be the variation of the speed component $\omega_2/\omega_1 \cos\theta_2$ of the radial outer tip of the cutting knife in the direction of cap shell transport. It is seen from FIG. 5 that at the point in time when rotational angle $\theta_1$ of the input gear 22 is 0° (where $\theta_1$ extends from $-45°$ to $+45°$) that the speed component is at its minimum, which consequently is also the point in time that the radial outer tip of the cutting knife is closest to the inner bottom surface of the cap shell.

The lining material is thrust onto the inner bottom surface of the cap shell by the knife when the radial outer tip of the knife nears the inner bottom surface. Preferably the material once placed on the bottom surface should not thereafter be moved by the knife. However, when there is a difference between the speed component of the radial outer tip of the cutting knife in the transport direction of the cap shell and the transport speed of the cap shell, then in some instances the lining material may be propelled out of the cap shell by the knife. In order to prevent this the speed component $\omega_2/\omega_1 \cos\theta_2$ of the radial outer tip of the cutting knife in the cap shell transport direction at the point in time the radial outer tip of the knife is closest to the inner bottom surface of a cap shell (that is, in FIG. 5, where $\theta_1 = 0°$) should equal substantially the transport speed of the cap shells. Any difference between the speed component of the radial outer tip of the knife in the cap shell transport direction and the cap shell transport speed should be as small as possible, not only at the point in time when the radial tip is closest to the inner bottom surface of the shell, but also in approximate zones of time where the radial tip will be close to the inner bottom surface to prevent movement of the lining material. Such approximate zones of time in FIG. 5 extend from $\theta_1 - 45°$ to $\theta + 45°$. This requires that the speed component $\omega_2/\omega_1 \cos\theta_2$ of the radial outer tip of the cutting knife in the cap shell transport direction should be kept uniform as much as possible in the approximate zone (for example the zone where $\theta_1$ is $-45°$ to $+45°$) of the point in time where $\theta_1 = 0°$ in FIG. 5. As will be understood from FIG. 5, the need for uniform speed component in the approximate zone in time requires that when a non-circular gear pair as shown in FIG. 3 is used for nonconstant rotation of the cutting knife, that the non-circular gear pair used should have smaller degrees of oblateness.

Thus when a set 20 of non-circular gear pairs is used for variable speed rotation of the cutting knife, it is important to use a non-circular gear pair that best conforms to two conditions:

(a) in order to prevent the radial outer tip of the cutting knife from colliding with the skirt of the cap shell, the gear should have an oblateness degree of a value higher than the one specified by the depth of the cap shell, and (b) in order to maintain variations in the speed component of the radial outer tip of the cutting knife in the cap shell transport direction as small as possible in the zone near the point in time where the outer radial tip of the cutting knife is closest to the inner bottom surface of the cap shell, the gears should have an oblateness degree as small as possible within a range that will satisfy condition (a).

Consequently the most suitable value for oblateness degree of the set of non-circular gear pairs used will vary depending on the depth of the cap shell in which the lining material is to be distributed.

As described earlier, non-circular gears presently on the market are restricted to those having fixed degrees of oblateness and using non-circular gears having an oblateness degree outside the fixed degrees requires special manufacturing. Also, in order to provide for cap shells of varying depths, a plurality of non-circular gears must be installed having various oblateness degrees. Further, it is difficult if not impossible to manufacture non-circular gears with oblateness degrees higher than 0.331, and consequently the above condition (a) cannot be satisfied for cap shells with depths over a predetermined value.

The present invention is one that resolves the problems described above by using a transmission mechanism containing at least two sets of non-circular gear pairs and having relative angles between two non-circular gear pairs that are freely adjustable, where the transmission mechanism converts a uniform and constant rotation of a drive means to a variable and nonconstant rotation drive for the rotatable knife.

Figure 6:
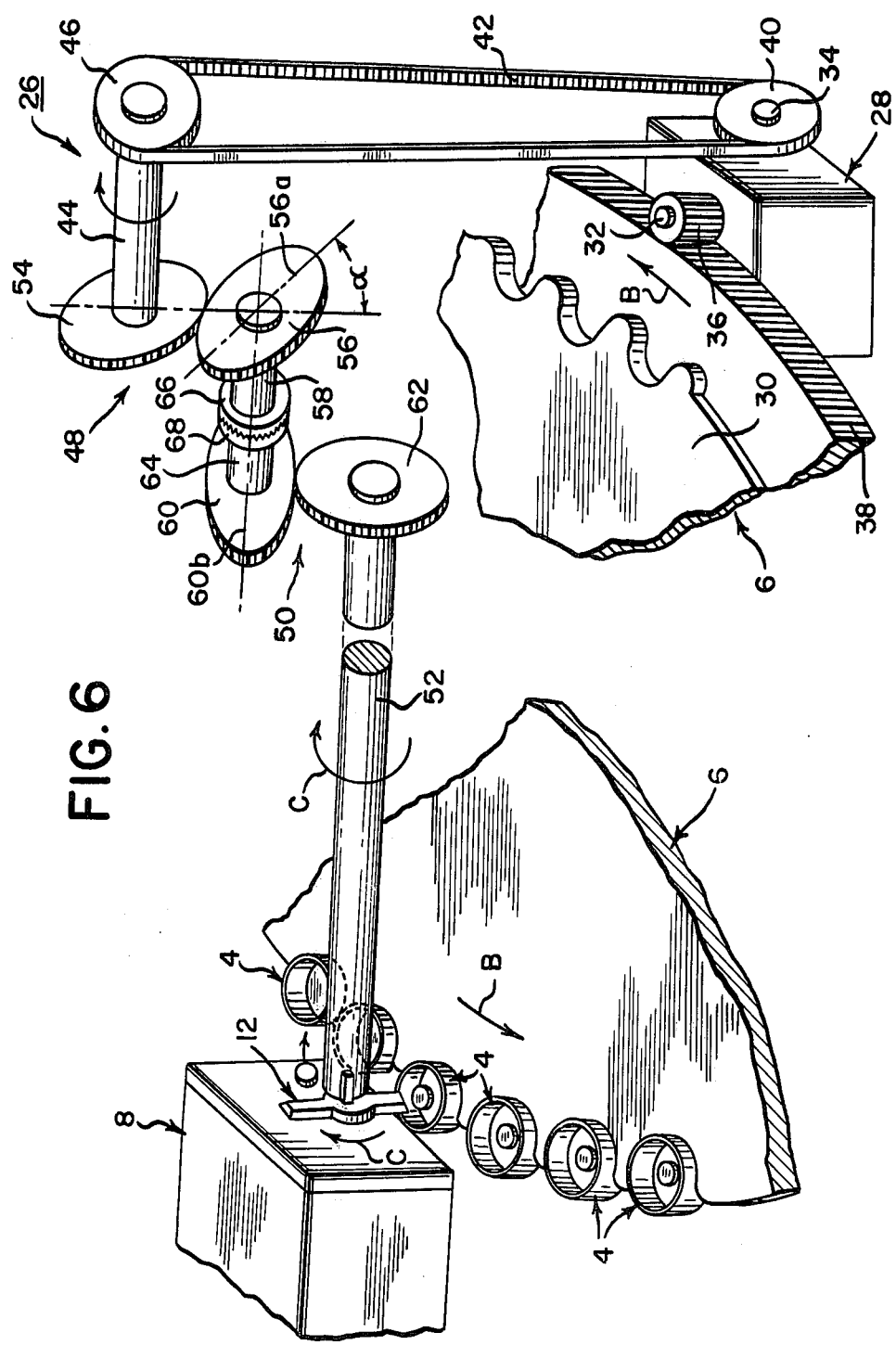
FIG. 6 is a diagrammatical sketch illustrating a portion of the transmission mechanism of the apparatus of FIG. 1.

Referring to FIG. 6, an apparatus is illustrated having a transmission mechanism denoted generally 26 constructed according to the invention operatively connected to a speed reducing means 28 such as a reduction gear box. The input shaft of the speed reducing means 28 is connected to the output shaft of a suitable drive source (not illustrated), for example, an electric motor. The speed reducing means 28 has a first output shaft 32 for rotating turret 30 of transport apparatus 6 for transporting the cap shells at a predetermined speed, and a second output shaft 34 for rotating a cutting knife 12.

Gear 36 is attached to the first output shaft 32 of speed reducing means 28 and engages with gear 38 mounted on turret 30. Consequently, speed reducing means 28, gear 36 and gear 38, are rotated by the drive source such that the transport means 6 rotates in the direction of arrow B at a predetermined speed.

Timing pulley 40 is attached to a second output shaft 34 of speed reducing means 28. Timing pulley 40 is connected by means of timing belt 42 to timing pulley 46 in turn attached to one end of shaft 44 which is rotatably supported by a suitable bearing means (not illustrated). Shaft 44 is operatively connected by means of two sets 48 and 50 of non-circular gear pairs to cutting knife support shaft 52 having a cutting knife 12 installed on one end thereof and rotatably supported by means of a suitable bearing means (not illustrated). Consequently, cutting knife support shaft 52 and cutting knife 12 installed thereon are rotated in the direction shown by arrow C by the drive source via second output shaft 34 of the speed reducing means 28, timing pulley 40, timing belt 42, timing pulley 46 and the two sets 48 and 50 of non-circular gear pairs.

Figure 7:
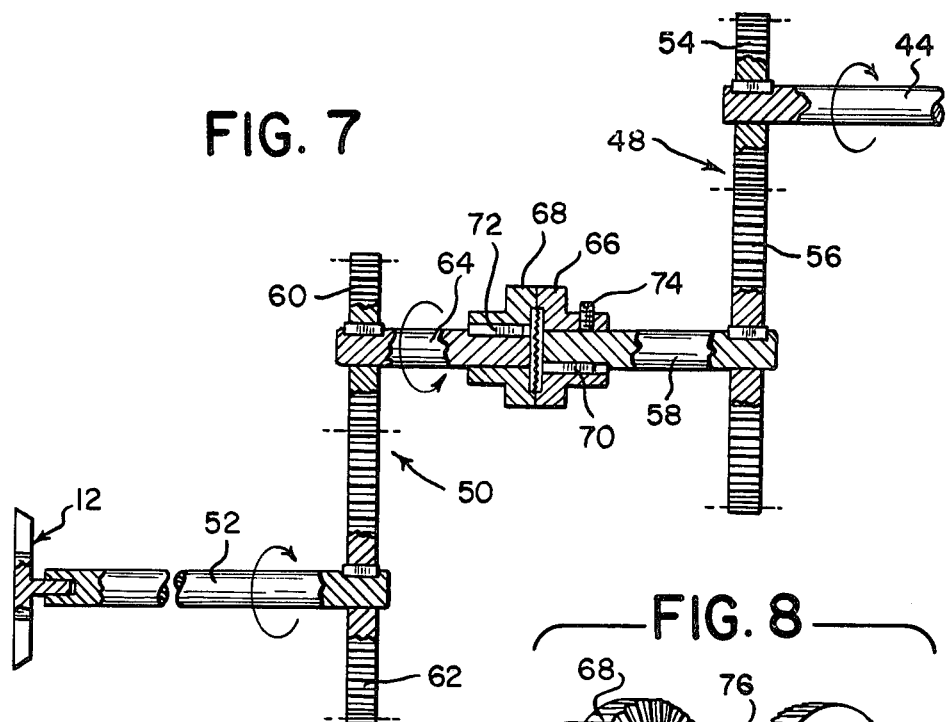
FIG. 7 is an enlarged sectional side view of a portion of the transmission mechanism of FIG. 6.

The two sets of non-circular gear pairs are illustrated in detail in FIGS. 6-7. The first set 48 of non-circular gear pairs is constructed of two non-circular gears which are mutually engaged (consequently they have the same oblateness degree $\epsilon_1$), such that one gear forms an input non-circular gear 54 and the other gear an output non-circular gear 56. Input non-circular gear 54 is attached to one end of shaft 44 having the timing pulley 46 attached thereto and rotates uniformly with the timing pulley 46 and the shaft 44. Output non-circular gear 56 is attached to one end of shaft 58 mounted which is rotatably supported by a suitable bearing means (not illustrated). The second set 50 of non-circular gear pairs is constructed from two non-circular gears which are mutually engaged (consequently, they also have the same oblateness degree $\epsilon_2$), such that one gear forms an input non-circular gear 60 and one gear forms an output non-circular gear 62. Input non-circular gear 60 is rotatably supported by means of a suitable bearing (not illustrated) and is attached to a shaft 64. Shaft 64 is consolidated with a shaft 58 having the output non-circular gear 56 of the first set 48 attached thereto. Output non-circular gear 62 is attached to one end of the cutting knife support shaft 52 which has cutting knife 12 installed at the other end.

Figure 8:
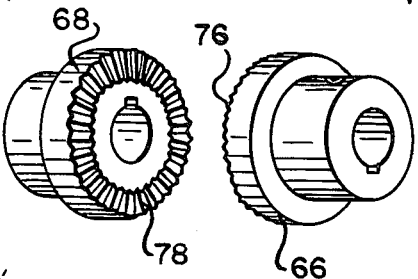
FIG. 8 is an enlarged angular view of the coupling elements utilized in the transmission mechanism illustrated in FIG. 6.

It is important that in the transmission mechanism 26 of the present invention, that the relative angle $\alpha$ between the long axis 56a of the output gear 56 of the first set 48 and the long axis 60b of the input gear 60 of the set 50 be freely adjustable. In order to make $\alpha$ readily adjustable, the shaft 58 comprising the output shaft of the first set 48 of non-circular gear pairs is made adjustable with respect to shaft 64 comprising the input shaft of the second set 50 non-circular gear pairs. In the embodiment illustrated, the facing ends of shaft 58 and shaft 64 are respectively furnished with coupling elements 66 and 68 as shown in detail in FIG. 8. Coupling elements 66 and 68 are keyed to shafts 58 and 64 by keys 70 and 72 so that they will not rotate relative to the shafts. At least one of the coupling elements is mounted so that it may move axially with respect to the shaft to which it is attached. Thus in FIG. 7, coupling element 66 is shown mounted for axial movement on shaft 58 with the element being locked in position by suitable lock means 74. The mutually engaging end surfaces of the coupling elements 66 and 68 comprise a plurality of radially extending drive surfaces 76 and 78 which on engagement provide a connection between the output shaft 58 and input shaft 64. In order to vary the relative angle $\alpha$ between the two sets 48 and 50 of non-circular gear pairs, lock means 74 is first released and coupling elements 66 and 68 disengaged by moving coupling element 66 along shaft 58. Coupling element 66 (and consequently shaft 58 and the first set 48 of non-circular gear pairs) is then rotated to the desired angle, after which coupling element 66 is moved along shaft 58 to again engage with coupling element 68 and locked with lock means 74.

It would also be possible to vary the angle $\alpha$ by mounting either gear 56 or 60 so that it is adjustable on a solid shaft connecting the two gears.

Figure 9:
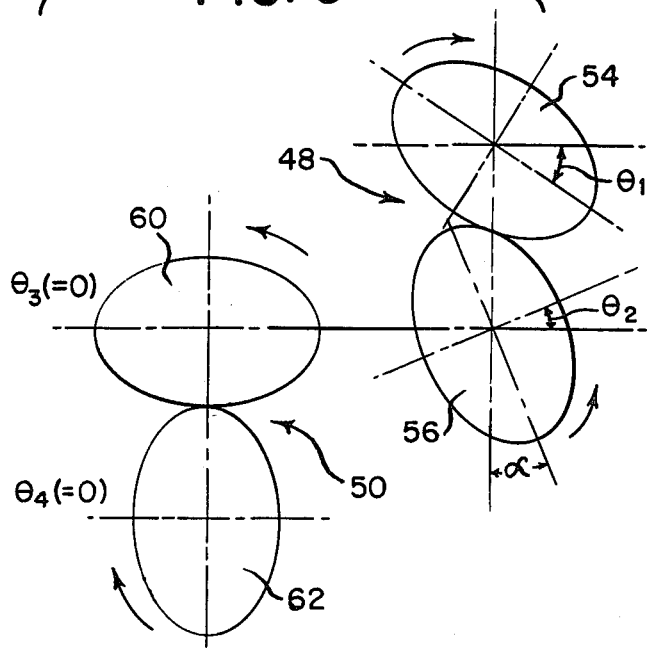
FIG. 9 is a diagrammatical sketch illustrating engagement of two sets of non-circular gear pairs.

Referring to FIG. 9 and considering first the time when the relative angle $\alpha$ between the first set 48 of non-circular gear pairs the second set 50 non-circular gear pairs is 0°, it will be clear from the equation explained with reference to FIG. 3 that rotational angle $\theta_2$ of output non-circular gear 56, relative to rotational angle $\theta_1$ of input non-circular gear 54 of first non-circular gear pair 48 will be $$\theta_1 = \tfrac{1}{2} \cos^{-1}\left( \frac{k_1 + \cos 2\theta_1}{1 + k_1 \cos 2\theta_1} \right) \quad (1)$$

where $k_1 = \dfrac{2g_1}{1 + g_1^2}$

Angular speed $\omega_2$ of the output non-circular gear 56, relative to constant angular speed $\omega_1$ of input non-circular gear 54, will be $$\omega_2 = \omega_1 \frac{\sqrt{1 - k_1^2}}{1 + k_1 \cos 2\theta_1} \quad (2)$$

In the same manner, the rotational angle $\theta_4$ of output non-circular gear 62 relative to the rotational angle $\theta_3$ of input non-circular gear 60 of the second set 50 of non-circular gear pairs will be $$\theta_4 = \tfrac{1}{2} \cos^{-1}\left( \frac{k_2 + \cos 2\theta_3}{1 + k_2 \cos 2\theta_3} \right) \quad (3)$$

where $k_2 = \dfrac{2g_2}{1 + g_2^2}$

Angular speed $\omega_4$ of the output non-circular gear 62 relative to the angular speed $\omega_3$ of the input non-circular gear 60 will be $$\omega_4 = \omega_3 \frac{\sqrt{1 - k_2^2}}{1 + k_2 \cos 2\theta_3} \quad (4)$$

On the other hand, since output non-circular gear 56 of the first set 48 of non-circular gear pairs and the input non-circular gear 60 of the second set 50 of non-circular gear pairs are coupled by means of shafts 58 and 64 and the relative angle $\alpha$ is zero, then $$\theta_2 = \theta_3 \quad (5)$$

$$\omega_2 = \omega_3 \quad (6)$$

In order to simplify the calculations, assume that the oblateness degree $\epsilon_1$ of the first set 48 of non-circular gear pairs and oblateness degree $\epsilon_2$ of the second set 50 of non-circular gear pairs are $\epsilon_1 = \epsilon_2 = \epsilon$. Consequently $\kappa_1 = \kappa_2 = \kappa$ since non-circular gears of identical oblateness degrees $\epsilon$ are used in the first set 48 of non-circular gear pairs and the second set 50 of non-circular gear pairs. Thus the rotational angle $\theta_4$ of the output non-circular gear 62 of the second set 50 of non-circular gear pairs relative to the rotational angle $\theta_1$ of input non-circular gear 54 of the first set 48 of non-circular gear pairs, from the above equations (1), (3) and (5), is $$\theta_4 = \tfrac{1}{2} \cos^{-1}\left( \frac{2k + (k^2 + 1) \cos 2\theta_1}{1 + k^2 + 2k \cos 2\theta_1} \right) \quad (7)$$

Also, its angular speed $\omega_4$ of the output non-circular gear 62 of the second set 50 relative to the constant angular speed $\omega_1$ of the input non-circular gear 54 of the first set 48 from the above equations (2), (4) and (6), is $$\omega_4 = \omega_1 \frac{1 - k^2}{(1 + k \cos 2\theta_1)(1 + k \cos 2\theta_2)} \quad (8)$$

Consequently, the rotational angular speed ratio $\omega_4/\omega_1$ of the angular speed $\omega_4$ of the output non-circular gear 62 of the second set 50 relative to the constant angular speed $\omega_1$ of the input non-circular gear 54 of the first set 48 and consequently the variation in rotational speed of cutting knife 12, is $$\frac{\omega_4}{\omega_1} = \frac{1 - k^2}{(1 + k \cos 2\theta_1)(1 + k \cos 2\theta_3)} \quad (9)$$

Figure 10:
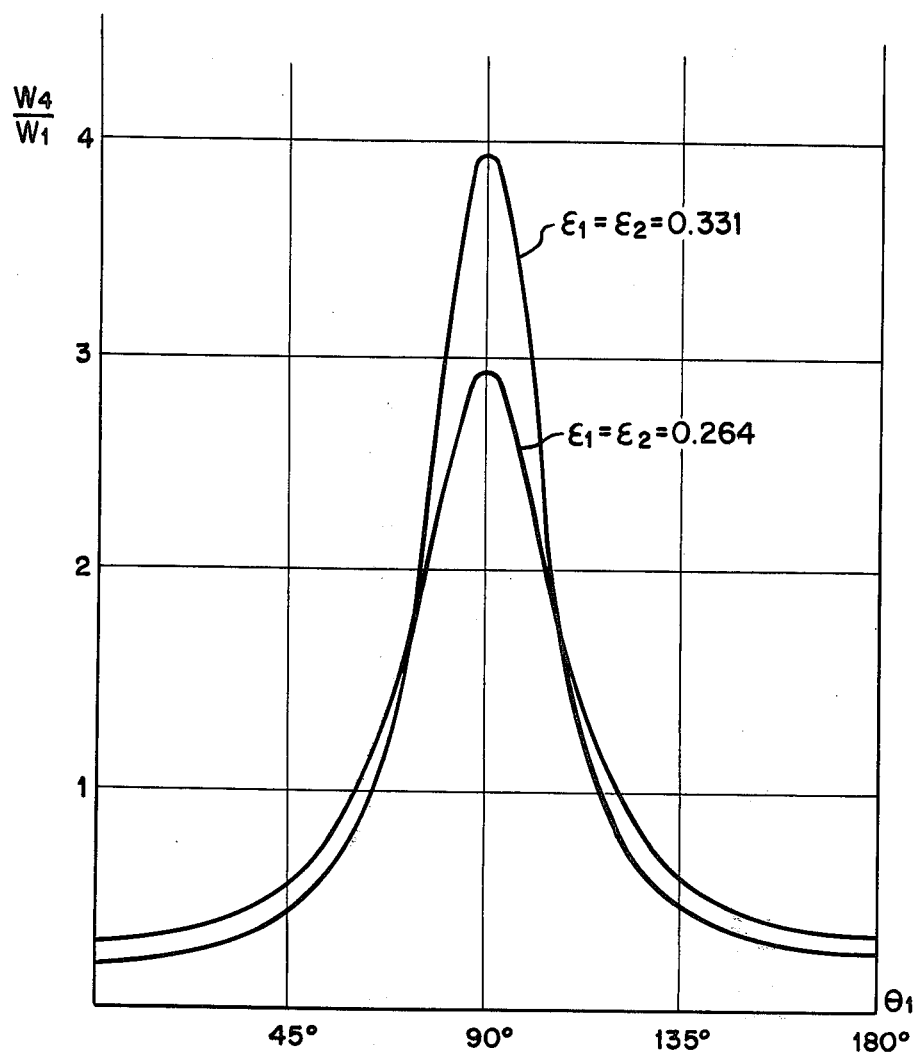
FIG. 10 is a graph illustrating variations in the rotational speed of a cutting knife utilizing two sets of non-circular gear pairs having different degrees of oblateness in the transmission mechanism connecting a drive to a cutting knife where the relative angle between non-circular gear pairs is 0°.

Referring to FIG. 10 the rotational angular speed ratio $\omega_4/\omega_1$ is shown for the case when oblateness degrees $\epsilon_1$ and $\epsilon_2$ of the first set 48 of non-circular gear pairs and the second set 50 of non-circular gear pairs are both 0.331 (that is, $\epsilon_1 = \epsilon_2 = \epsilon = 0.331$) and the case when they are 0.264 (that is, $\epsilon_1 = \epsilon_2 = \epsilon = 0.264$). Consequently, in each of these cases, cutting blade 12 is rotated at a non-constant speed by speed variations as shown in FIG. 10 when the input shaft of the first set 48, that is shaft 44, is rotated at constant angular speed $\omega_1$.

Figure 11:
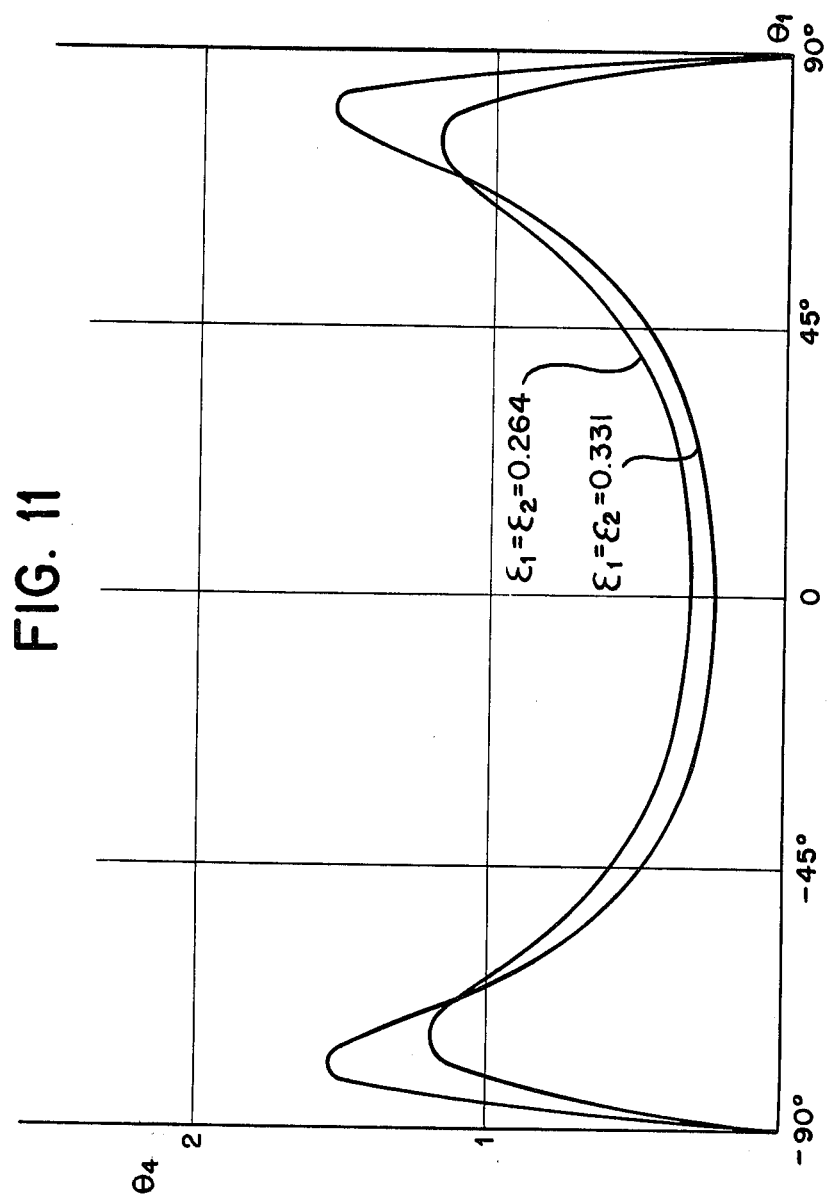
FIG. 11 is a graph illustrating variations in the speed component of the radial outer tip of a cutting knife in the cap shell transport direction when two sets of non-circular gear pairs having different degrees of oblateness are used in the transmission mechanism and where the relative angle between the two sets of non-circular gear pairs is 0°.

In these instances the speed component of the radial outer tip of the cutting blade 12 in the cap shell transport direction is $\omega_4/\omega_1 \cos \theta_4$ respectively, as shown in FIG. 11.

On comparing FIGS. 10 and 11 which relate to a transmission having two sets of non-circular gear pairs of equal degrees of oblateness and having a relative angle $\alpha$ of 0° with FIGS. 4 and 5 which relate to a transmission having one set of non-circular gear pairs of the same degree of oblateness, it is seen that the variation in rotational speed of the cutting knife 12 is considerably larger for the transmission utilizing the two sets of non-circular gear pairs. Also it is seen when using the two set transmission that the speed variations of the radial outer tip of the cutting knife in the cap shell transport direction are larger in the zone where the knife approaches the inside bottom surface of the shell (the zone where $\theta_1$ is $-45°$ to $+45°$).

The effect of a change in the relative angle $\alpha$ between the first set 48 of non-circular gear pairs and the second set 50 of non-circular angular gear pairs with reference to FIG. 9 is calculated as follows.

Figure 12:
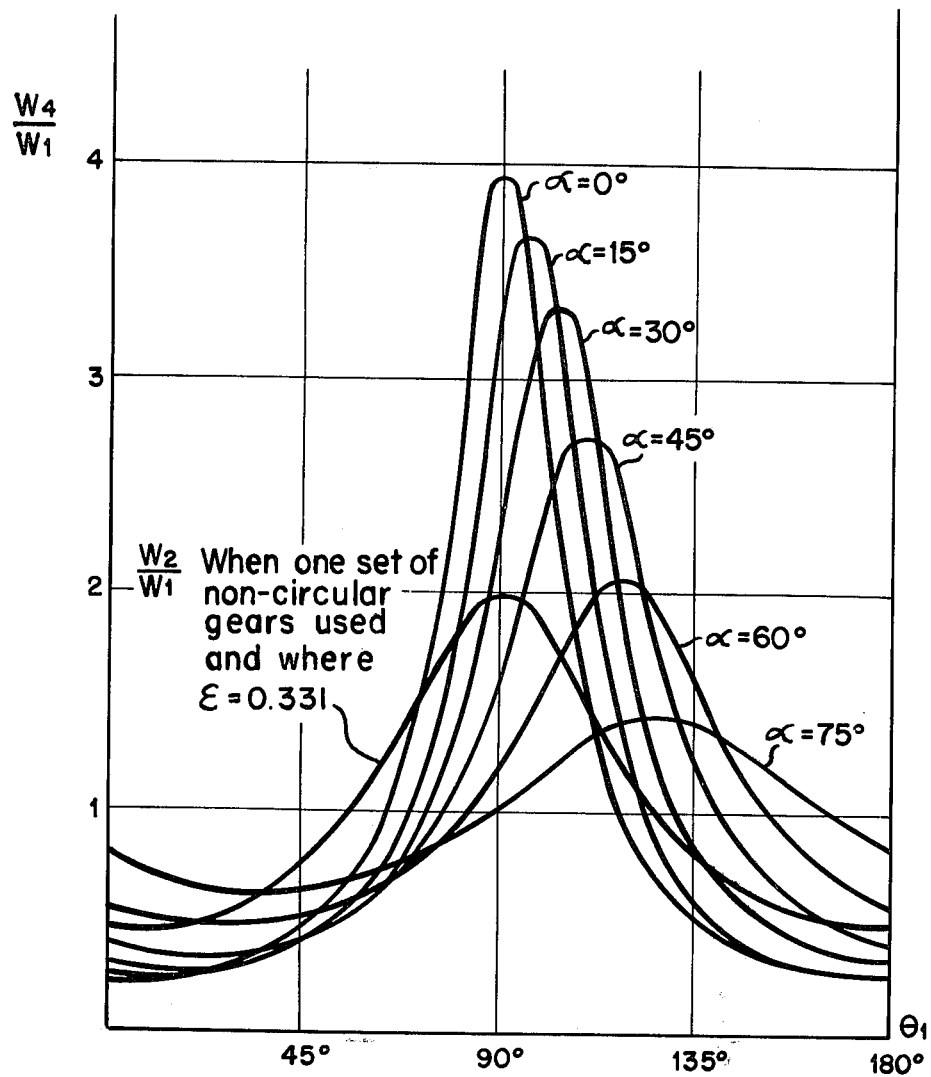
FIG. 12 is a graph illustrating variation in the rotational speed of a cutting knife utilizing two sets of non-circular gear pairs having the same degrees of oblateness and where the relative angle between the two sets varies.

Since $\theta_3 = \theta_2 = \alpha$ from the above equations (1) and (3), rotational angle $\theta_4$ of the output non-circular gear 62 of the second set 50 relative to the rotational angle $\theta_1$ of the input non-circular gear 54 of the first set 48 will be $$\theta_4 = \tfrac{1}{2} \cos^{-1}\left( \frac{k + \cos 2\theta_3}{1 + k \cos 2\theta_3} \right) \quad (10)$$

where $\theta_3 = \tfrac{1}{2} \cos^{-1}\left( \frac{k + \cos 2\theta_1}{1 + k \cos 2\theta_1} \right) - \alpha$ Also since $\omega_2 = \omega_3$ from the above equations (2) and (4), the angular speed $\omega_4$ of the output non-circular gear 62 of the second set 50 relative to the constant angular speed $\omega_1$ of the input non-circular gear 54 of the first set 48 will be $$\omega_4 = \omega_1 \frac{1 - k^2}{(1 + k \cos 2\theta_1)(1 + k \cos 2\theta_3)} \quad (11)$$

where $\theta_3 = \tfrac{1}{2} \cos^{-1}\left( \frac{k + \cos 2\theta_1}{1 + k \cos 2\theta_1} \right) - \alpha$ Consequently, rotational angular speed ratio $\omega_4/\omega_1$ of the angular speed of the second set 50 of non-circular gear pairs relative to the constant angular speed $\omega_1$ of the input non-circular gear 54 of the first set 48 of non-circular gear pairs will be $$\frac{\omega_4}{\omega_1} = \frac{1 - k^2}{(1 + k \cos 2\theta_1)(1 + k \cos 2\theta_3)} \quad (12)$$

where $\theta_3 = \tfrac{1}{2} \cos^{-1}\left( \frac{k \cos 2\theta_1}{1 + k \cos 2\theta_1} \right) - \alpha$ Referring to FIG. 12, the rotational speed of the cutting knife $\omega_4/\omega_1$ is illustrated for several cases where the relative angle $\alpha$ is 15°, 30°, 45°, 60° and 75° and where the degree of oblateness $\epsilon_1$ and $\epsilon_2$ for the first set 48 of non-circular gear pairs 48 and the second set 50 of non-circular gear pairs are both 0.331 (that is $\epsilon_1 = \epsilon_2 = \epsilon = 0.331$). Further, in the case where $\alpha$ is 90°, the conversion of speed by the first set 48 of non-circular gear pairs is completely cancelled out by the conversion of speed by the second set 50 of non-circular gear pairs, such that $\omega_4/\omega_1 = 1$ and consequently the cutting knife 12 rotates at a constant speed at the same angular speed as the input 44 of the first set 48. FIG. 12 also shows, for purposes of comparison, the rotational angular speed ratios $\omega_4/\omega_1$ and $\omega_2/\omega_1$ for the case when $\alpha = 0°$ and the case when the oblateness degree $\epsilon$ is 0.331 and only one set of non-circular gear pairs is used.

Figure 13:
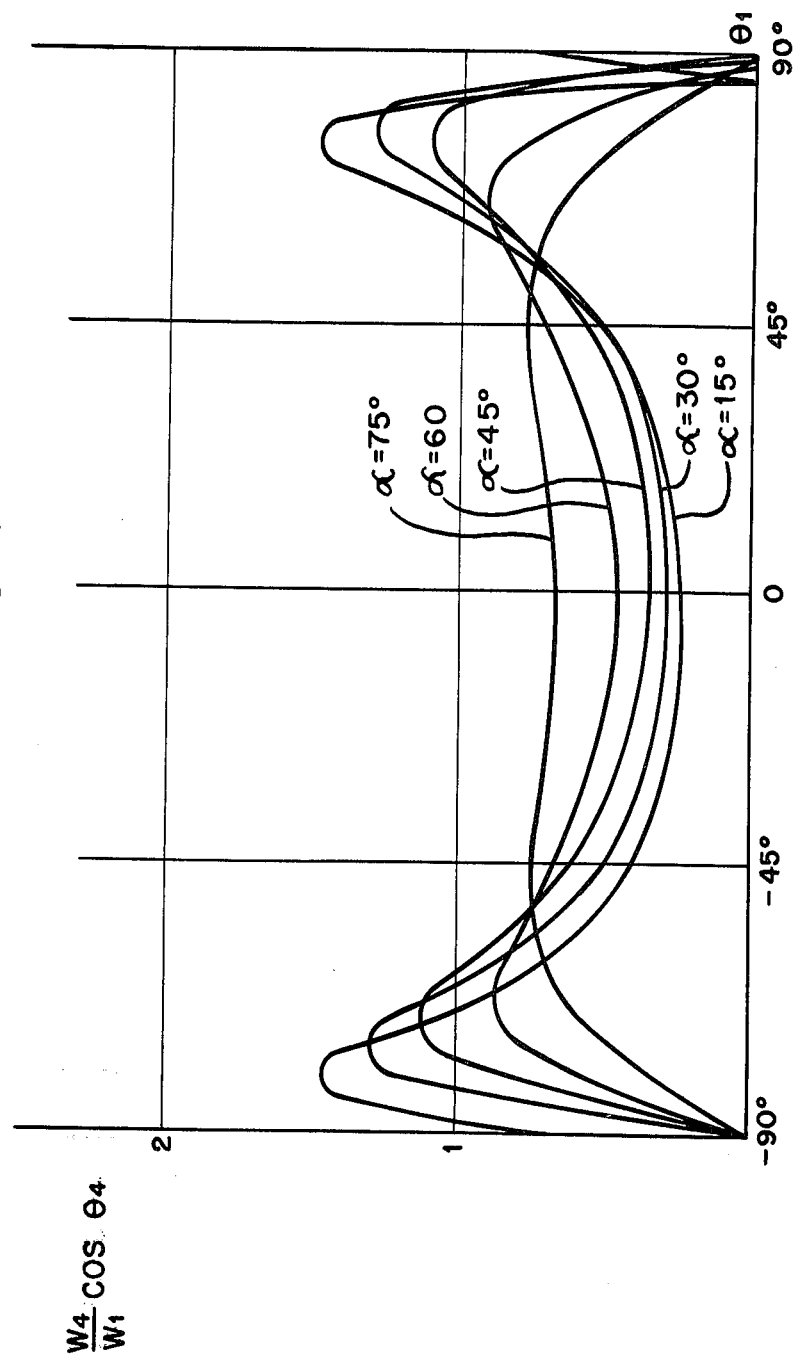
FIG. 13 is a graph illustrating variations in the speed component of the radially outer tip of a cutting knife in the cap shell transport direction where two sets of non-circular gear pairs are utilized and where the relative angle between the two sets varies.

Referring to FIG. 13, the speed component $\omega_4/\omega_1 \cos \theta_4$ of the radial outer tip of the cutting knife 12 in the cap shell transport direction is shown for several cases where the relative angle $\alpha$ is 15°, 30°, 45°, 60° and 75° and where the oblateness degrees $\epsilon_1$ and $\epsilon_2$ of the first set 48 of non-circular gear pairs and the second set 50 of non-circular gear pairs are both 0.331 (that is, $\epsilon_1 = \epsilon_2 = \epsilon = 0.331$).

Figure 14:
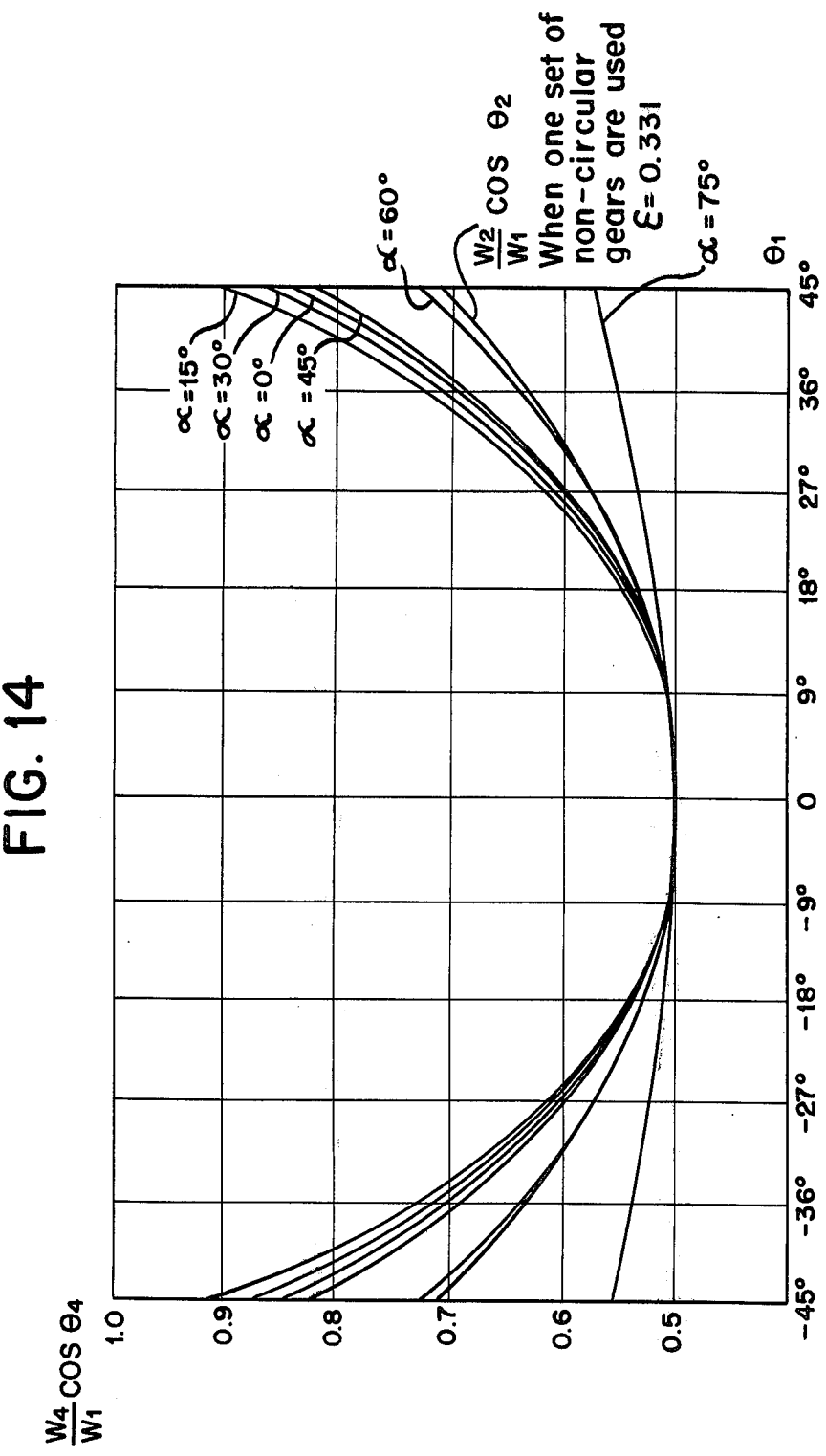
FIG. 14 is a graph illustrating portions of the variations in the speed components illustrated in FIG. 13 calculated so that their respective minimum values are 0.5 at the instant in time when the radial outer tip of the cutting knife is closest to the inner bottom surface of a cap shell.

FIG. 14 illustrates the speed component $\omega_4/\omega_1 \cos \theta_4$ for the several cases shown in FIG. 13 calculated so that their respective minimum values are 0.5, in order to compare the degrees of variations in speed components of the radial outer tip of the cutting knife 12 in the cap shell transport direction in the zone about the point in time when $\theta_1 = 0°$, that is when the radial outer tip of cutting knife 12 is close to the inner bottom surface of cap shell 4 (for example, the zone where $\theta_1$ is $-45°$ to $+45°$). FIG. 14 also shows, for purposes of comparison, the speed components $\omega_4/\omega_1 \cos \theta_4$ and $\omega_2/\omega_1 \cos \theta_2$ of the radial outer tip of cutting knife 12 in the cap shell transport direction, for the case when $\alpha = 0°$ and the case when the oblateness degree $\epsilon$ is 0.331 and only one non-circular gear pair is used.

Referring to FIG. 12, it is seen that as the relative angle $\alpha$ gradually increases from 0°, the variation in angular speed $\omega_4$ of cutting knife 12 relative to constant angular speed $\omega_1$ of the input shaft 44 of the first set 48 of non-circular gear pairs gradually decreases. It is seen also that when the relative angle $\alpha$ is about 60°, that the variation in angular speed is nearly the same as the case when only one set of non-circular gear pairs is used having a degree of oblateness of 0.331. Thus it is clear that as the relative angle $\alpha$ exceeds 60°, oblateness degree $\epsilon$ will become smaller than when only one 0.331 non-circular gear pair is used, and when the relative angle $\alpha$ reaches 90°, variations in angular speed $\omega_4$ of the cutting knife 12 relative to constant angular speed $\omega_1$ of input shaft 44 of the first set 48 of non-circular gear pairs 48 become non-existent resulting in $\omega_4/\omega_1 = 1$ and cutting knife 12 being rotated at a constant speed. Consequently, with the apparatus of the present invention, by appropriately varying the relative angle $\alpha$ between 0° and 90°, it becomes possible to regulate the degree of variations in angular speed $\omega_4$ of the cutting knife 12 as desired, except that in the case where $\alpha = 0°$, there are no variations in speed because when $\alpha = 0°$, then $\omega_4/\omega_1 = 1$ It is seen by reference to FIGS. 13 and 14 that the variation in speed component $\omega_4/\omega_1 \cos \theta_4$ of the radial outer tip of the cutting knife in the zone where $\theta_1$ extends from $-45°$ to $+45°$ is larger when the relative $\alpha$ is 15° and 30° than when $\alpha$ is 0°. However, when $\alpha$ is 45°, the speed variation is nearly the same as when $\alpha$ is 0° and the speed variation then decreases as $\alpha$ increases such that when $\alpha = 60°$, the speed variation is nearly the same as when only one set of non-circular gear pairs are used having an oblateness degree of 0.331. As $\alpha$ exceeds 60° and increases further, the speed variation becomes smaller than when only one circular gear pair having an oblateness degree $\epsilon$ of 0.331 is used. Furthermore, since when $\alpha$ reaches 90° $\omega_4/\omega_1 = 1$ and the speed component of the radial outer tip of the cutting knife 12 in the cap shell transport direction is then $\omega_4/\omega_1 \cos \theta_4 = \cos \theta_4$ and the variation enters a special condition completely different from the case when $0° \leq \alpha < 90°$.

From the above facts taken with reference to FIGS. 12 to 14, it is apparent that, with the apparatus of the present invention wherein transmission device 26 includes at least two sets 48 and 50 of non-circular gear pairs and relative angle $\alpha$ between the two sets of non-circular gear pairs is freely adjustable, it then becomes possible to suitably regulate the degree of variation in the rotational speed of the cutting knife 12 by varying the relative angle $\alpha$ to suit the depth of the cap shell 4 in which lining material is to be distributed. Further it is apparent that by varying the relative angle $\alpha$ between 0° and 60° that it is possible to impart a larger degree of variable speed rotation to cutting knife 12 than that obtained when only one set of non-circular gears is used. It is also apparent that by varying the relative angle $\alpha$ between 60° and 90° that it is possible to impart a smaller degree of variable speed rotation to cutting knife 12 than the variation obtained when only one set of non-circular gears is used.

In the example illustrated, transmission mechanism 26 includes two sets 48 and 50 of non-circular gear pairs, but it is also possible for transmission mechanism 26 to contain three or more sets of non-circular gear pairs in cases when it is desired to impart a higher degree of variable speed rotation to cutting knife 12 than those obtained when relative angle α of the two sets of non-circular gear pairs 48 and 50 is 0°.

I claim:

1. An apparatus for distributing lining material in cap shells where the apparatus has a cap shell transport means for moving cap shells at a predetermined speed along a path, a lining material extrusion means positioned above and along said path for extruding a predetermined amount of lining material through an extrusion passage, a rotatable lining material cutting knife positioned adjacent the exit end of said extrusion passage adapted to move across lining material extruded from said passage to cut the same, drive means for rotating said knife, and a transmission means operatively connecting said drive means to said knife; the improvement comprising in that said transmission means contains at least two sets of non-circular gear pairs and wherein the relative angle between the said two sets of gear pairs is adjustable.

2. An apparatus according to claim 1 the improvement further comprising in that one of said sets of gear pairs has an output shaft and another of said sets has an input shaft and in having an adjustable connecting means connecting said output shaft to said input shaft wherein the relative angle between the two shafts may be regulated to adjust the relative angle between said sets of gear pairs.

3. An apparatus according to claim 2 the improvement further comprising in that said adjustable connecting means comprises a coupling element positioned on the facing end of each said shaft and wherein each said coupling element has radially extending drive surfaces where the surfaces of one element are adapted to drivingly engage the surface of the other element.

4. An apparatus according to claim 3 the improvement further comprising in that at least one of said coupling elements is movable axially with respect to its shaft whereby the drive surfaces of the elements may be disengaged from each other when said one of said coupling elements is moved axially away from the other of said coupling elements.

* * * * *